United States Patent [19]

Kondoh et al.

[11] Patent Number: 4,600,284
[45] Date of Patent: Jul. 15, 1986

[54] GRIP FOR A CAMERA

[75] Inventors: Yuji Kondoh, Tokyo; Tadahide Fukushima, Kanagawa, both of Japan

[73] Assignee: Canon Kabushiki Kaisha, Tokyo, Japan

[21] Appl. No.: 567,533

[22] Filed: Jan. 3, 1984

[30] Foreign Application Priority Data

Jan. 6, 1983 [JP] Japan ................................. 58-304[U]

[51] Int. Cl.⁴ ............................................. G03B 17/00
[52] U.S. Cl. ..................................... 354/82; 354/293; 352/243
[58] Field of Search ......................... 354/82, 293, 288; 352/243, 242

[56] References Cited

U.S. PATENT DOCUMENTS 2,793,573  5/1957  Cuchet ................................. 352/243
3,240,143  3/1966  Koeber et al. ....................... 352/243
3,299,931  1/1967  Kritzler ................................ 354/288
4,050,796  9/1977  Komine ................................ 352/243
4,232,958  11/1980 Fukahori et al. .................... 354/288

Primary Examiner—A. A. Mathews
Attorney, Agent, or Firm—Toren, McGeady, Stanger, Goldberg & Kiel

[57] ABSTRACT

A grip for a camera including a grip body, a fixing mechanism having a manually operable member fixing the grip body to the camera body in a predetermined state and a movable covering for covering the manually operable member of the fixing mechanism.

23 Claims, 6 Drawing Figures

GRIP FOR A CAMERA

BACKGROUND OF THE INVENTION

1. Field of the Invention

The present invention relates to a grip for a camera.

2. Description of the Prior Art

Presently available grips adapted for use with a video camera, a movie-camera, or a still camera include, in general, a so-called detachable type which is attachable to and detachable from the camera body and a so-called foldable type which is attached to a camera body in such a manner as to be capable of occupying one of two positions relative to the camera body, the two positions including an operating position and a storage or folded position. Both types of such grips include a member for fixing the grip body to the camera body in a predetermined state during an operating condition. Thus, of detachable type the grip usually includes, for example, a coupling screw and the foldable type of grip includes a locking member for locking the grip body at an operating position and in most cases the manually operable member of the fixing means is provided in a manner so as to be exposed to the outside of the grip body. However, if the manually operable member of the fixing means is exposed to the outside of the grip body, there is a possibility that a hand or a finger grasping the grip at the time of holding the camera may inadvertently touch the manually operable member, impairing the fixed state of the grip body. Also the fact that the manually operable part is exposed to the outside of the grip body is not desirable not only because of operational difficulties but also in respect to the design and appearance of the grip.

SUMMARY OF THE INVENTION

Therefore, an object of the present invention is to provide a grip for a camera which can eliminate the abovestated disadvantages in conventional types of grips for cameras.

Another object of the present invention is to provide a unique and useful grip for a camera, which can securely insure firm fixing of the grip body to the camera body having desirable features in its operating characteristics and with respect to its design and appearance.

Briefly the present invention may be described as comprising a grip including a grip body, fixing means having a manually operable member and fixing the grip body to a camera body in a predetermined state and movable covering means for covering the manually operable member of the fixing means. In this case, the covering means can be attached to the grip body pivotably between a position to cover the manually operable member of the fixing means and a position not to cover the same.

Alternatively, the covering means can be attached to the grip body slidably between a position to cover the manually operable member of the fixing means and a position not to cover the same.

In accordance with a further alternative, the covering means can be freely attachable to and detachable from the grip body.

In addition to the foregoing, the covering means can be made to form a grip portion of the grip which together with a part of the grip body covers the manually operable members of the fixing means.

In accordance with a further aspect of the invention, space may be provided for receiving a battery or batteries inside the grip body, in which the covering means also serves as a lid for an opening of the space for receiving the battery or batteries.

Thus, the grip according to the present invention has many advantages, and disadvantages of conventional types of grips are eliminated. Firm connection of the grip body to the camera body in an operating state can be securely achieved and the grip has excellent operating (handling) characteristics as well as improved aspects in the design and appearance. Furthermore, advantages may be achieved in a relatively simple manner without incurring undue increase in cost.

Further objects and features of the present invention will be apparent from the following descriptions on embodiments referring to the accompanying drawings.

DETAILED DESCRIPTION OF THE PREFERRED EMBODIMENTS

Figure 1A:
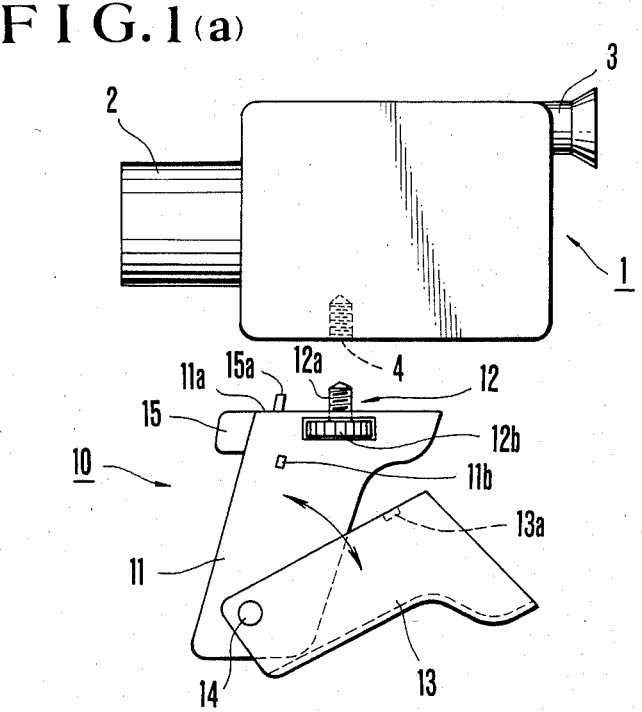
FIGS. 1(a) and 1(b) are side illustrations showing a first embodiment together with a camera body.
Figure 1B:
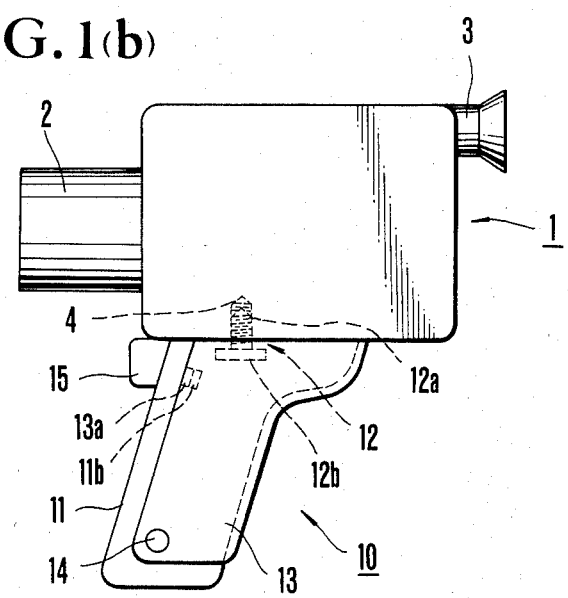

A first embodiment of the present invention shown in FIGS. 1(a) and 1(b), comprises a video camera or a movie-camera 1 including a photo-taking lens 2 and a view finder 3, with a threaded hole 4 being provided for attaching a tripod or a grip 10. The grip 10 includes a grip body 11 and is fixing means 12 for fixing the grip body 11 to the camera body 1, the fixing means 12 having a screw part 12a to be engaged with the threaded hole 4 on the camera body 1 and an operating ring 12b which is integral with the screw part 12a and has a portion thereof protruding out of a side plane of the grip body 11. The fixing means 12 is provided at a part of the grip body 11 in a freely rotatable manner with the screw part 12a protruding out of an upper end surface 11a of the grip body 11. A covering means 13 is attached to a part of the grip body 11 by a shaft 14 pivotably as shown by the arrow in FIG. 1(a) for selectively covering the operating ring 12b of the fixing means 12. The covering means 13 has a shape matching the shape of the grip body 11 so as to form a grip portion of the grip 10 together with a part of the grip body 11 when in a position covering the operating ring 12b. The covering means 13 has an engaging part 13a which engages with a projection 11b provided at a part of the grip body 11 when the covering means 13 is placed at a covering position shown in FIG. 1(b). The grip 10 includes is a camera triggering operation button 15 and a trigger member 15a coupling thereto.

In such an arrangement, when the grip 10 is first fixed to the camera body 1, the covering means 13 is pivoted clockwise around the shaft 14 as shown in FIG. 1(a) to expose the operating ring 12b of the fixing means 12 and the screw part 12a of the fixing means 12 is aligned to the threaded hole 4 of the camera body 1. The operating ring 12b is then operated to engage the screw part 12a with the threaded hole 4 for fixing the grip body 11 to the camera body 1. Thereafter, the covering means 13 is pivoted counterclockwise around the shaft 14 for covering the operating ring 12b. Also at this time the engaging part 13a of the covering means 13 engages with the projection 11b of the grip body 11, thereby fixing the covering means 13 to the grip body 11.

When the grip 10 is to be disconnected from the camera body this may be accomplished by reversing the process described above.

Thus, the operating ring 12b of the fixing means 12 is covered with the covering means 13 when the grip 10 is used as shown in FIG. 1(b), and the hand or finger of an operator grasping the grip 10 will not touch the operating ring 12b inadvertently. Therefore firm fixing of the grip 10 to the camera body 1 can be insured and the operating ring 12b will not form an obstacle in the operation of the camera. Furthermore, the grip provides enhanced features in respect to design and appearance.

The second embodiment of the present invention will be described by referring to FIGS. 2(a) and 2(b), in which component parts shown with the same reference numerals as in FIGS. 1(a) and 1(b) are the same elements as described above and those identified by the same numerals with single dash are corresponding elements. While FIGS. 2(a) and 2(b) show a grip only, the camera body to which the grip is applied is the same as shown in FIGS. 1(a) and 1(b).

In these drawings, the grip comprises a grip body 11 having an upper end surface 11′a, a projection 11′b, a guide rail 11′c and a battery chamber 11′d. The covering means 13′ has an engaging groove 13′b engagable with the guide rail 11′c on the grip body 11′ and an engaging part 13′a engagable with the projection 11′b, wherein the covering means 13′ is arranged to be freely attachable to and detachable from the grip body 11′. With respect to the total shape of the grip, it has a similar shape as that shown in FIGS. 1(a) and 1(b). Except for the elements described above, the structure is basically the same as shown in FIGS. 1(a) and 1(b).

Figure 2A:
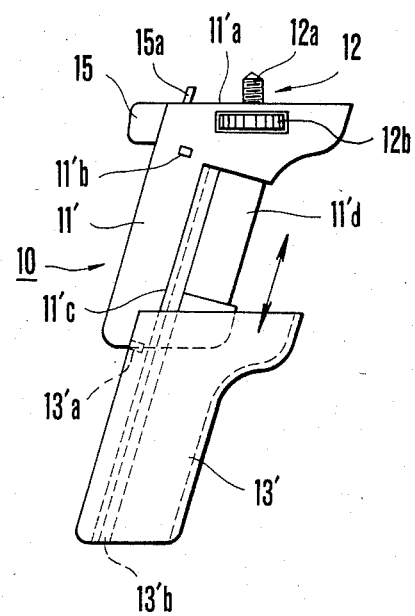
FIGS. 2(a) and 2(b) are side illustrations showing a second embodiment of the present invention.
Figure 2B:
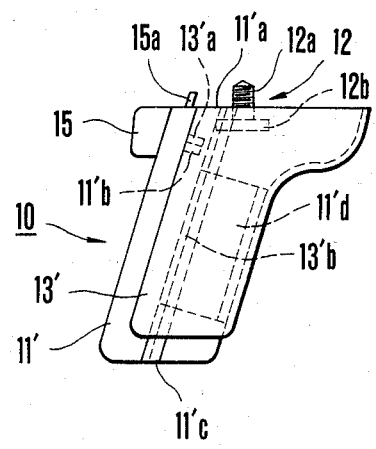

In a grip 10 having such an arrangement, the covering means 13′ slides upwards thereby covering the operating ring 12b of the fixing means 12 and closing the battery chamber 11′d as shown in FIG. 2(b) in a state with the engaging groove 13′b of the covering means 13′ being engaged with the guide rail 11′c of the grip body 11′ as shown in FIG. 2(a). Thus effects the same as in the first embodiment shown in FIGS. 1(a) and 1(b) can be obtained. Also, in the state shown in FIG. 2(b), the covering means 13′ is fixed to the grip body 11′ by the engaging part 13′a which engages with the projection 11′b on the grip body 11′.

The third embodiment of the present invention will be described referring to FIGS. 3(a) and 3(b), in which component parts shown with the same numerals as in FIGS. 1(a) and 1(b) and FIGS. 2(a) and 2(b) are the same elements as described above, and those identified by the same numerals with double dash are corresponding elements.

While the grip 10 in the above first and second embodiments is of an attachable and detachable type, the grip 10 in this third embodiment is of a foldable type.

Figure 3A:
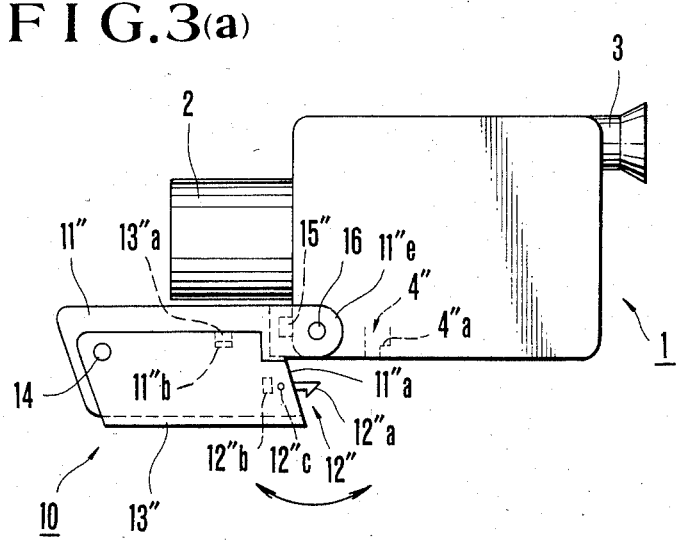
FIGS. 3(a) and 3(b) are side illustrations showing a third embodiment of the present invention together with a camera body.
Figure 3B:
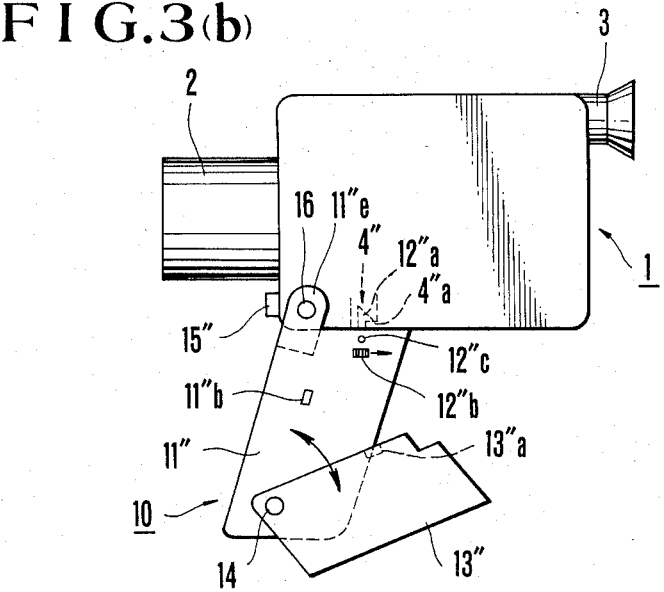

In the drawings, the grip comprises a grip body 11, which is attached to a camera body at a lug part 11″e thereof in a pivotable manner between an operating position (FIG. 3(b)) and a storage (folded) position (FIG. 3(a)) by a shaft 16 provided at a part of the camera body 1. The grip body 11″ has a projection 11″b and a locking member 12″ operates to fix the grip body 11″ to the camera body 1 when the grip 10 is in the operating position (FIG. 3(b)). The member 12″ comprises a hook part 12″e engaging with a step part 4″a within an engaging hole 4″ on the camera body 1, and an operating button 12″b which is integral with the hook part 12″a and protrudes from a side surface of the grip body 11″ for releasing the engagement of the hook part 12″a with the step part 4″a of the engaging hole 4″. The locking member 12″ is pivotably supported at a part of the grip body 11″ by a shaft 12″c so that the hook part 12″a protrudes out of an upper end surface 11″a of the grip body 11″. Also the locking member 12″ is urged clockwise around the shaft 12″c by a spring (not shown). A covering means 13″ is pivotably supported at a part of the grip body 11″ by the shaft 14 for covering the operating button 12″b of the locking member 12″, and it has a shape matching the grip body 11″. Furthermore, it has an engaging part 13″a which engages with the projection 11″b of the grip body 11″. A camera trigger button 15″ is also provided on the camera body 1.

In the arrangement described above, the grip 10 is set at a position shown in FIG. 3(a) when not in use. When it is to be used, the grip 10 is pivoted counterclockwise around the shaft 16 and it is set at a position protruding downwards out of the lower part of the camera body 1. At that time the hook part 12″a of the locking member 12″ enters into the engaging hole 4″ and engages with the step part 4″a thereof, thereby locking the grip body 11″ to the camera body 1 at the operating position. In this position, the operating button 12″b of the locking member 12″ is covered with the covering means 13″, preventing the hand or finger of an operator from inadvertently touching the button. Thus, the occurrence that the locking is inadvertently released during the use of the grip can be effectively prevented.

In order to change the grip 10 from the operating state to the nonoperating state the covering means 13″ is pivoted clockwise around the shaft 14 as shown in FIG. 3(b) for removing the covering means 13″ from the operating button 12″b of the locking member 12″, and thereafter the button 12″b is moved to the right against the spring (not shown), and the engagement of the hook part 12″a with the step part 4″a of the engaging hole 4″ is thus released. The grip body 11″ is pivoted clockwise around the shaft 16 so as to set the grip body 11″ at a position at which the grip body 11″ extends along the lower end of the photo-taking lens 2 as shown in FIG. 3(a). After that the covering means 13″ is pivoted counterclockwise around the shaft 14 and is returned to the state shown in FIG. 3(a). At this time the engaging part 13″a of the covering means 13″ engages with the projection 11″b of the grip body 11″, thus fixing the covering means 13″ to the grip body 11″.

While the embodiments shown above have an arrangement such that each of the covering means 13, 13′ and 13″ has a shape matching the grip body 11, 11′ and 11″, respectively and forms a grip portion of the grip 10 together with a part of the grip body 11, 11′ and 11″, respectively at its covering position (FIG. 1(b), FIG. 2(b) and FIG. 3(b)), the covering means can naturally be made to provide only the function of covering the operating ring 12b or the operating button 12″b without having the function of forming a grip portion. Also, the covering means 13, 13′ and 13″ may be made of plastic material or hard rubber material, etc., and a surface roughing process may be provided thereon for enhancing the gripping characteristics of the surface threof. Alternatively, a soft rubber sheet having a roughened surface may be pasted thereon. Further, in the embodiments shown in FIGS. 1(a) and 1(b) and FIGS. 3(a) and 3(b), the battery receiving compartment may be formed inside the grip body 11 and 11" as in the embodiment shown in FIGS. 2(a) and 2(b). Also as a modification of the embodiment shown in FIGS. 3(a) and 3(b), the covering means 13" thereof may be attachable to the grip body 11" in a slidable manner as in the embodiment shown in FIGS. 2(a) and 2(b). Furthermore, as a modification of the embodiment shown in FIG. 2(a), 2(b), the covering means 13' may be slidably attachable to the grip body 11' in a manner to be slidable along the short length direction (lateral left and right direction) instead of attaching the same in a manner to be slidable in the long length direction (vertical up and down direction). Also, in another modification the covering means 13' may be made attachable to the grip body 11' at a position shown in FIG. 2(b) with hinges provided so as to come along the guide rail 11'b in the operable and closable manners. Furthermore, in the embodiment shown in FIGS. 3(a), 3(b), when the lug part 11"e of the grip body 11" is made attachable to and detachable from the camera body 1 by, for example, a screw or threaded member corresponding to the shaft 16, the covering means 13" may be made so as to cover the lug part 11"e and the screw or threaded part corresponding to the shaft 16.

While the above embodiments refer to cases where the present invention is applied to a grip for a video camera or a movie-camera, the present invention is not limited to such embodiments, and can be widely applied to grips for cameras, including, for example, grips for still cameras.

While specific embodiments of the invention have been shown and described in detail to illustrate the application of the inventive principles, it will be understood that the invention may be embodied otherwise without departing from such principles.

What we claim is:

1. A camera comprising:
   (A) a camera body; and
   (B) a foldable grip having:
      (B-1) a grip body;
      (B-2) attaching means for attaching said grip body to said camera body so that the grip body is pivotable between a folded and an unfolded position relative to the camera body;
      (B-3) locking means for locking said grip body relative to said camera body at said unfolded position of the grip body;
      (B-4) manually operable means operable for releasing the locking of said grip body relative to said camera body by said locking means; and
      (B-5) covering means attached to said grip body and movable relative thereto for covering and uncovering said manually operable means, said covering means being movable to cover said grip body when said grip body is locked by said locking means at said unfolded position.

2. A grip for a camera having a camera body, comprising:
   a grip body;
   manually operable fixing means for fixing said grip body to the camera body at a position to enable manual holding of said camera, said fixing means having a manually operable member; and
   covering means for covering said manually operable member of said fixing means in a condition that said grip body is fixed at said camera holding position; said covering means being attached to said grip body and slidable between a covering and an uncovering position relative to said manually operable member of said fixing means.

3. A grip according to claim 2, wherein said covering means is arranged to form a grip portion of the grip together with said grip body when covering said manually operable member of said fixing means.

4. A camera comprising: a camera body; and a foldable grip having a grip body, attaching means for attaching said grip body to said camera body so that the grip body is pivotable between a folded and an unfolded position relative to the camera body, locking means for locking said grip body relative to said camera body at said unfolded position of the grip body, manually operable means operable for releasing the locking of said grip body relative to said camera body by said locking means, and covering means for covering said manually operable means, said covering means being attached to said grip body and pivotable between a covering and an uncovering position relative to said manually operable means.

5. A camera comprising: a camera body; and a foldable grip having a grip body, attaching means for attaching said grip body to said camera body so that the grip body is pivotable between a folded and an unfolded position relative to the camera body, locking means for locking said grip body relative to said camera body at said unfolded position of the grip body, manually operable means operable for releasing the locking of said grip body relative to said camera body by said locking means, and covering means for covering said manually operable means, said covering means being attached to said grip body and slidable between a covering and an uncovering position relative to said manually operable means.

6. A camera comprising: a camera body; and a foldable grip having a grip body, attaching means for attaching said grip body to said camera body so that the grip body is pivotable between a folded and an unfolded position relative to the camera body, locking means for locking said grip body relative to said camera body at said unfolded position of the grip body, manually operable means operable for releasing the locking of said grip body relative to said camera body by said locking means, and covering means for covering said manually operable means, said covering means being detachable from said grip body.

7. A camera comprising: a camera body; and a foldable grip having a grip body, attaching means for attaching said grip body to said camera body so that the grip body is pivotable between a folded and an unfolded position relative to the camera body, locking means for locking said grip body relative to said camera body at said unfolded position of the grip body, manually operable means operable for releasing the locking of said grip body relative to said camera body by said locking means, and covering means for covering said manually operable means, said covering means being arranged to form a grip portion of the grip together with said grip body when covering said manually operable means.

8. A camera comprising: a camera body; and a foldable grip having a grip body, attached means for attaching said grip body to said camera body so that the grip body is pivotable between a folded and an unfolded position relative to the camera body, locking means for locking said grip body relative to said camera body at said unfolded position of the grip body, manually operable means operable for releasing the locking of said grip body relative to said camera body by said locking means, and covering means for covering said manually operable means, said grip body having a chamber for receiving therein a battery and an opening for said chamber, said covering means being arranged to cover said opening when covering said manually operable means.

9. A grip attachable to a camera body, comprising:
a grip body;
attaching means for attaching said grip body to said camera body, said attaching means having manually operable means; and
covering means for covering said manually operable means of said attaching means;
said covering means being attached to said grip body and slidable between a covering and an uncovering position relative to said manually operable means of said attaching means.

10. A grip attachable to a camera body, comprising:
a grip body;
attaching means for attaching said grip body to said camera body, said attaching means having manually operable means; and
covering means for covering said manually operable means of said attaching means;
said camera body having a receiving portion for receiving a tripod, said attaching means being arranged to fixedly attach said grip body to said receiving portion of said camera body.

11. A grip attached to a camera body, comprising:
a grip body;
attaching means for attaching said grip body to said camera body, said attaching means having manually operable means; and
covering means for covering said manually operable means of said attaching means;
said attaching means including coupling means for pivotably coupling said grip body to said camera body so that the grip body is pivotable between a folded and an unfolded position relative to the camera body, said coupling means having a manually operable member, said covering means being arranged to cover said manually operable member of said coupling means.

12. A grip according to claim 11, wherein said attaching means further includes locking means for locking said grip body relative to said camera body at said unfolded position of the grip body, said locking means having a manually operable member; and wherein said covering means is further arranged to cover said manually operable member of said locking means.

13. A grip for a camera having a camera body, comprising:
a grip body;
manually operable fixing means for fixing said grip body to the camera body at a position to enable manual holding of said camera, said fixing means having a manually operable member; and
covering means for covering said manually operable member of said fixing means in a condition that said grip body is fixed at said camera holding position, said covering means being detachable from said grip body.

14. A grip for a camera having a camera body, comprising:
a grip body;
manually operable fixing means for fixing said grip body to the camera body at a position to enable manual holding of said camera, said fixing means having a manually operable member; and
covering means for covering said manually operable member of said fixing means in a condition that said grip body is fixed at said camera holding position;
said grip body having a chamber for receiving therein a battery and an opening for said chamber, said covering means being arranged to cover said opening when covering said manually operable member of said fixing means.

15. A grip according to claim 14, wherein said grip body is attached to said camera body and pivotable between a folded and an unfolded position relative to the camera body; and wherein said fixing means is arranged to lock said grip body relative to said camera body at said unfolded position of the grip body.

16. A grip attachable to the body of a camera, comprising:
a grip body;
attaching means for attaching said grip body to said camera body at a position to enable manual holding of said camera, said attaching means having manually operable means; and
covering means for covering said manually operable means of said attaching means in a condition that said grip body is attached at said camera holding position, said covering means being attached to said grip body and slidable between a covering an an uncovering position relative to said manually operable means of said attaching means.

17. A grip attachable to the body of a camera, comprising:
a grip body;
attaching means for attaching said grip body to said camera body at a position to enable manual holding of said camera, said attaching means having manually operable means; and
covering means for covering said manually operable means of said attaching means in a condition that said grip body is attached at said camera holding position, said covering means being detachable from said grip body.

18. A grip according to claim 17, wherein said covering means is attached to said grip body and pivotable between a covering and an uncovering position relative to said manually operable means to said attaching means.

19. A grip according to claim 17, wherein said covering means is arranged to form a grip portion of the grip together with said grip body when covering said manually operable means of said attaching means.

20. A grip attachable to the body of a camera, comprising:
a grip body;
attaching means for attaching said grip body to said camera body at a position to enable manual holding of said camera, said attaching means having manually operable means; and
covering means for covering said manually operable means of said attaching means in a condition that said grip body is attached at said camera holding position;
said grip body having a chamber for receiving therein a battery and an opening for said chamber, said covering means being arranged to cover said opening when covering said manually operable means of said attaching means.

21. A grip attachable to the body of a camera, comprising:
   a grip body;
   attaching means for attaching said grip body to said camera body at a position to enable manual holding of said camera, said attaching means having manually operable means; and
   covering means for covering said manually operable means of said attaching means in a condition that said grip body is attached at said camera holding position;
   said camera body having a receiving portion for receiving a tripod, said attaching means being arranged to fixedly attach said grip body to said receiving portion of said camera body.

22. A grip attachable to the body of a camera, comprising:
   a grip body;
   attaching means for attaching said grip body to said camera body at a position to enable manual holding of said camera, said attaching means having manually operable means; and
   covering means for covering said manually operable means of said attaching means in a condition that said grip body is attached at said camera holding position;
   said attaching means including coupling means for pivotably coupling said grip body to said camera body so that the grip body is pivotable between a folded and an unfolded position relative to the camera body, said coupling means having a manually operable member, said covering means being arranged to cover said manually operable member of said coupling means.

23. A grip according to claim 22, wherein said attaching means further includes locking means for locking said grip body relative to said camera body at said unfolded position of the grip body, said locking means having a manually operable member; and wherein said covering means is further arranged to cover said manually operable member of said locking means.

* * * * *